April 23, 1963    F. HENNIG ETAL    3,086,435
AUTOMATIC CAMERAS

Filed July 18, 1961    3 Sheets-Sheet 1

INVENTOR.
FRIDOLIN HENNIG
JOACHIM V. ALBEDYLL
BY

April 23, 1963     F. HENNIG ETAL     3,086,435
AUTOMATIC CAMERAS Filed July 18, 1961     3 Sheets-Sheet 2

Fig. 3

INVENTOR.
FRIDOLIN HENNIG
JOACHIM V. ALBEDYLL
BY

April 23, 1963  F. HENNIG ETAL  3,086,435
AUTOMATIC CAMERAS
Filed July 18, 1961  3 Sheets-Sheet 3

Fig.4

INVENTOR.
FRIDOLIN HENNIG
JOACHIM V. ALBEDYLL
BY

United States Patent Office 3,086,435
Patented Apr. 23, 1963

3,086,435
AUTOMATIC CAMERAS
Fridolin Hennig and Joachim V. Albedyll, Munich, Germany, assignors to Agfa Aktiengesellschaft, Leverkusen-Bayerwerk, Germany
Filed July 18, 1961, Ser. No. 125,001
Claims priority, application Germany July 19, 1960
9 Claims. (Cl. 95—10)

The present invention relates to cameras.

More particularly, the present invention relates to automatic cameras which are capable of automatically setting the camera to provide for proper exposure of the film according to the lighting conditions.

Known automatic cameras have exceedingly complex structures for providing for the automatic setting of the exposure-controlling elements of the camera. These structures include a relatively large number of parts which are expensive to manufacture and assemble and which give rise to an undesirably large number of faulty operations requiring repairs too frequently.

It is accordingly a primary object of the present invention to provide an automatic camera which is exceeding simple as compared to conventional automatic cameras and which at the same time is far more reliable in operation.

Another object of the present invention is to provide an automatic camera which includes an extremely small number of moving parts and which in addition includes parts which for the most part can be in the form of simple stampings, so that the structure of the invention is extremely simple.

It is also an object of the present invention to provide an automatic camera which permits the operator to select one of several possible programs of automatic operation, so that in this way it becomes possible to set the camera automatically to provide the best possible exposure for the particular subject.

An additional object of the present invention is to provide an automatic camera which is extremely compact so that the structure required to effect the automatic operations occupy an extremely small amount of space and therefore enable the structure of the invention to be incorporated into a camera of relatively small dimensions.

With the above objects in view the invention includes, in a camera, an exposure control means for setting the camera to expose film therein and a lever means turnable from a rest position. This lever means has a control portion which cooperates with the control means to actuate the latter to set the camera during turning of the lever means from its rest position, and in addition a scanning means is actuated by the lever means. A light-sensing means senses the lighting conditions and is located in the path of movement of the scanning means to be engaged thereby for limiting the movement of the scanning means and thus limiting the movement of the lever means according to the lighting condition, so that in this way the camera will be automatically set according to the lighting conditions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
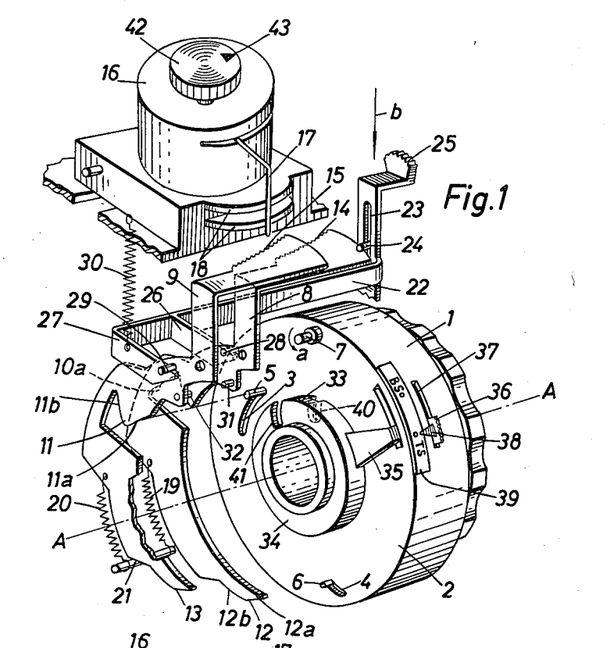
FIG. 1 is a perspective exploded view of one possible embodiment of an automatic camera according to the present invention.

Referring now to FIG. 1, there is shown therein a shutter housing 1 which houses a between-the-lens shutter as well as an iris diaphragm and the lenses of the objective. The rear wall 2 of the shutter housing 1 is formed with a pair of slots 3 and 4 through which a pair of pins 5 and 6 respectively extend, as indicated in FIG. 1. The pin 5 is connected to the structure within the housing 1 which sets the diaphragm so that when this pin 5 is moved downwardly along the slot 3 the exposure aperture of the camera will be adjusted, and in the particular example illustrated the pin 5 is shown in its position of rest where the diaphragm provides the largest exposure aperture and during downward movement of the pin 5 along the slot 3, as viewed in FIG. 1, the size of the exposure aperture is gradually reduced. The pin 6 is connected to conventional structure within the housing 1 which sets the exposure time, and in this case also the pin 6 in its rest position shown in FIG. 1 provides the longest exposure time, and during movement of the pin 6 to the right, as viewed in FIG. 1, along the slot 4 the exposure time is gradually reduced. Unillustrated springs within the housing 1 cooperate with the diaphragm-setting structure as well as with the exposure time setting structure to yieldably urge the pins 5 and 6 to the rest positions thereof indicated in FIG. 1 where they respectively provide the largest exposure aperture and the longest exposure time, in the illustrated example. Thus, the elements 5 and 6 form an exposure control means which will set the camera to provide for a particular exposure of the film therein.

A support means is provided not only by the housing 1 but also by the pivot pin 7 which extends parallel to the optical axis A—A and which is fixed to and projects rearwardly from the rear wall 2 of the housing 1. A pair of lever means 8 and 9 are turnably carried by the pivot pin 7 of the support means and are supported by the pivot pin 7 for turning movement independently of each other. Each of the lever means 8 and 9 has a pair of arms and at one of its arms carries a control portion for controlling the exposure control means 5, 6 during turning of each lever means from its rest position, and these control portions of the pair of lever means 8 and 9, respectively, provide different programs of control, respectively, as will be apparent from the description below, so that by selecting one of the lever means it is possible for the operator to provide a selected program of exposure control for the camera. The control portion 10 of the lever means 8 cooperates with the pin 5 (FIG. 2) for controlling the diaphragm so as to set the exposure aperture of the camera, while the control portion 11 of the lever means 9 cooperates with the pin 5 for setting the diaphragm during turning of the lever 9. The control portions of the levers 8 and 9 include the camming edges 12 and 13 which respectively cooperate with the pin 6 for setting the exposure time. The pair of lever means 8 and 9 also actuate a scanning means for scanning the position of a light-sensing means so as to limit the turning of each lever means according to the lighting conditions, and in the embodiment of FIGS. 1 and 2 the scanning means takes the form of a pair of toothed scanning edges 14 and 15 of the levers 8 and 9. It will be noted that these scanning portions 14 and 15 of the levers 8 and 9, respectively, are located on the second arms of the two-armed levers 8 and 9, the above-described arms of these levers carrying the control portions which cooperate with the exposure control means 5, 6. Also, it will be noted that the arm of each lever which carries the scanning means has a right-angle bend so that the scanning means extends parallel to the optical axis, while the arm of each lever which carries the control portion for cooperating with the pins 5 and 6 is located in a plane which is normal to the optical axis A—A. The pair of lever means 8 and 9 are shown in their rest positions in FIGS. 1 and 2, and it will be noted from FIG. 2 that in the rest position of the pair of lever means 8 and 9 the scanning means 15 is located directly over the scanning means 14.

Figure 2:
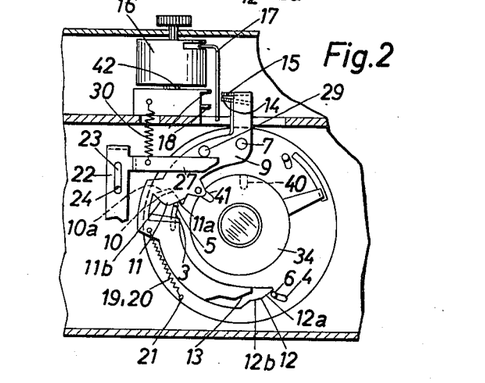
FIG. 2 is a rear elevational view of the structure of FIG. 1.

The light-sensing means includes the electrical meter or instrument 16 in the form of a galvanometer to whose rotor a pointer 17 is fixed, so that this pointer 17 turns with the rotor of the galvanometer, and as is conventional this instrument 16 is connected electrically with a suitable photocell or with a suitable electrical resistor which is sensitive to light so that the rotor of the instrument 16 assumes an angular position determined by the intensity of the light which reaches the photocell or light-sensitive resistor. Thus, the pointer 17 is free to turn to an angular position which is determined by the lighting conditions, and in the rest position of the pair of lever means 8 and 9 the scanning portions 14 and 15 thereof are spaced from the pointer 17 so that this pointer is free to turn to whichever angular position is dictated by the lighting conditions. The pointer 17 has a free end portion which extends downwardly and which moves along a pair of arcuate rigid elements 18 which support the pin or pointer 17 to limit the deflection thereof when engaged by a scanning edge 14 or 15.

A pair of turning means respectively cooperate with the pair of lever means 8 and 9 for turning the pair of lever means from their rest positions indicated in FIGS. 1 and 2, and this pair of turning means takes the form of a pair of springs 19 and 20 respectively connected at one end to the pair of lever means 8 and 9 at their opposite end to a stationary camera element such as the pin 21. Thus, the springs 19 and 20 respectively cooperate with the levers 8 and 9 to urge the latter to turn from the rest position shown in FIGS. 1 and 2 in the direction of the arrow *a* indicated in FIG. 1 adjacent to the pivot pin 7 which supports the pair of levers 8 and 9 for turning movement about a common axis parallel to the optical axis. Each of the springs 19 and 20 is stronger than the return springs within the housing 1 which return the exposure time setting structure and the aperture setting structure to the rest positions where the pins 5 and 6 have the positions indicated in FIG. 1, so that when either of the lever means is turned by its spring 19 or 20 this spring will be strong enough to move the pin 5 as well as the pin 6 in opposition to the return springs within the housing 1. The springs 19 and 20 are strong enough to turn the levers 8 and 9 and move the pins 5 and 6 from their rest positions to end positions which are respectively distant from the rest position shown in FIG. 1, and of course at this time the springs 19 and 20 also serve to move the scanning edges 14 and 15 toward and into engagement with the pointer 17 of the meter 16.

A manually operable holding means is provided for releasably holding the pair of lever means 8 and 9 in their rest positions indicated in FIGS. 1 and 2, and this holding means includes the manually shiftable rigid element 22 which is formed with elongated slots 23 through which pins 24 which are stationary respectively extend so as to provide a pin-and-slot connection of the member 22 to the camera for guiding the member 22 for vertical movement, and only one of the slots 23 and pins 24 is shown in the drawing for the sake of clarity. The manually operable holding means 22 is provided with a free end portion 25 located at the front of the camera and accessible to the operator so that this member 25 forms a finger piece which can be manipulated by the operator for moving the element 22 in the direction of the arrow *b* shown in FIG. 1. The holding means 22 includes a pair of rigid extensions 26 and 27 which respectively extend alongside of the levers 8 and 9, and the levers 8 and 9 respectively carry pins 28 and 29 which engage the extensions 26 and 27 in the manner indicated in FIG. 1. It will be noted that the springs 19 and 20 urge the levers 8 and 9 to turn in directions which maintain the pins 28 and 29 in engagement with the extensions 26 and 27 of the holding means 22. A relatively strong return spring 30 is connected at one end to the holding means 22 and at its opposite end to a stationary part of the camera for urging the holding means 22 upwardly to the initial position thereof indicated in FIGS. 1 and 2, and it will be noted that the pins 24 cooperate with the bottom ends of the slots 23 to limit the upward movement of the holding means 22. The spring 30 is stronger than the springs 19 and 20 by an amount sufficient to permit the member 22 to be moved by the spring 30 up to the position indicated in the drawings where the extensions 26 and 27 engage the pins 28 and 29 to hold the levers 8 and 9 in their rest positions in opposition to the springs 19 and 20 which of course are tensioned at this time.

A manually operable selecting means is provided so that the operator can select one of the levers 8 and 9 for operation, and in connection with this selecting means the pair of levers 8 and 9 are respectively provided with projections in the form of pins 31 and 32 respectively fixed to the levers 8 and 9 for turning movement therewith. In the illustrated example the selecting means include a manually turnable ring 34 which is turnable about the optical axis which is fixed to an arm 35 which projects from the ring 34 and which has an outer end portion 36 extending through a slot 37 of the shutter housing 1 to the exterior of the camera where the portion 36 is accessible to the operator so that the operator may turn the selecting ring 34 to an angular position which will provide operation by a selected lever 8 or 9. The outer peripheral surface 33 of the ring 34 cooperates with the pins 31 and 32 for preventing turning of the levers 8 and 9 by the springs 19 and 20, respectively. The free end portion 36 of the arm 35 carries an index member 38 which cooperates with an indicator 39 which indicates the particular program of operation which is to be selected. The selecting ring 34 is formed with a pair of notches 40 and 41 extending inwardly from its outer periphery 33 along paths which coincide with the paths of movement of the pins 31 and 32, respectively. Thus, when the notches 40 and 41 are respectively aligned with the projections 31 and 32 these notches extend along arcs of a circle whose center is in the axis of the pin 7 and whose radius is equal to the radial distance of the pins 31 and 32 from the axis of the pin 7. When the ring 34 is placed by the operator in one of its positions such as that indicated in FIG. 1, the open end of the notch 41 is aligned with the pin 32 while the outer periphery 33 of the ring 34 is located in the path of movement of the pin 31, so that in this position the operator has selected the lever 9 for operation and this lever 9 is free to turn since its pin 32 can enter and move along the notch 41. On the other hand, because the outer surface 33 of the ring 34 engages the pin 31 the lever 8 cannot turn and thus the operator has selected the program of control provided by the control portion 11, 13 of the lever means 9. When the arm 35 is turned by the operator to its second position the pin 32 will engage the outer periphery 33 of the ring 34 and therefore the lever 9 will not be able to turn by the spring 20, but at this time the notch 40 will be aligned with the pin 31 which now enters into the notch 40 so that the operator has selected the lever 8 for operation.

Thus, with the parts in the position shown in FIG. 1, the lever 9 has been selected for operation, and in the particular example illustrated the edge portion 11*a* of the camming edge 11 of the lever 9 will engage the pin 5 during the initial turning of the lever 9 so as to reduce the size of the exposure aperture during the initial turning of the ring 9. The extent to which the lever 9 can turn will of course be determined by engagement of its scanning portion 15 with the pointer 17 of the light-sensing means, and if there is so much light available that when the smallest exposure aperture of the camera has been reached it is still necessary to reduce the exposure time, then the camming edge portion 13 of the lever 9 will engage the pin 6 to shift the latter along the slot 4 for reducing the exposure time, and this exposure time in the rest position of the pin 6 may be, for example, one-thirtieth of a second while the shortest exposure time may be, for example, one five hundredth of a second. During actuation of the pin 6 by the camming edge 13 of the lever 9, the pin 5 is engaged by the edge portion 11b of the cam portion 11 of the lever 9, and the curvature of this edge portion 11b is such that it maintains the pin 5 in its end position, where in the illustrated example it provides the smallest exposure aperture, without further movement of the pin 5 during the time that the camming portion 13 engages the pin 6 to reduce the exposure time.

On the other hand, the control portions 10, 12 of the lever 8 are so formed that during the initial part of the turning of the lever 8 the camming portion 12a will engage the pin 6 to reduce the exposure time, and at this initial part of the turning of the lever 8 the pin 5 will remain stationary to hold the exposure aperture at its largest size. When the portion 12b of the camming edge 12 engages the pin 6 this pin 6 will have reached its end position, and the curvature of the portion 12b is such that the pin 6 will remain stationary while the camming edge portion 12b moves along the pin 6. However, at this time, which is to say at the end of the movement of the pin 6 when the camera has its shortest exposure time and when the camming edge portion 12b engages the pin 6, the camming portion 10a of the camming edge 10 will engage the pin 5 to move the latter downwardly along the slot 3 for reducing the size of the exposure aperture. Thus, when the lever 8 is selected for operation the exposure will be made with the shortest possible exposure time, and thus the program of control provided by the lever 8 is suitable for a rapidly moving subject. On the other hand, the control program provided by the lever 9 will give the smallest possible exposure aperture, and thus the program provided by the lever 9 is suitable for a subject where the greatest possible depth of field is desirable. The indicia of the indicator 39 which indicates the two positions of the index 38 respectively indicate that the camera will provide the greatest depth of field or the best possible exposure for a moving subject, and thus the operator need only move the index 38 to one or the other of its positions, in accordance with the particular subject which is being photographed, so as to select between the control programs provided by the pair of levers 8 and 9.

In order to take into account the speed of the film which is used in the camera, the entire instrument 16 is turnable about its axis, and for this purpose a knob 42 is fixed to the housing of the instrument 16 and it is exposed at the top of the camera where a scale is provided to cooperate with the index 43 carried by the knob 42, so that in this way the operator can turn the entire instrument 16 to an angular position which will introduce into the setting of the camera the factor of the speed of the film which is in the camera.

When the operator wishes to make an exposure with the structure of FIGS. 1 and 2, the operator will simply depress the finger-piece 25, after a selection of a program of control has been made by cooperation of the index 38 with the indicator 39, and this will result in movement of the extensions 26 and 27 of the member 22 downwardly away from the pins 28 and 29 so that the levers 8 and 9 are now released to the pair of turning means 19 and 20, respectively. The pair of springs 19 and 20 will now urge the levers 8 and 9 to turn, but in the illustrated position where a program of control providing the greatest of field has been selected the lever 8 cannot turn since the notch 42 is out of alignment with the pin 31, and since in this position the notch 41 is aligned with the pin 32, the lever 9 is free to be turned by the spring 20. The lever 9 will continue to turn until its scanning portion 15 engages the pointer 17 of the light-sensing means, and in this way the angle through which the lever 9 turns is determined by the lighting conditions. The pair of edges 18 cooperate with the pin 17 to limit the movement thereof and to reinforce the pin 17 so that the engagement between the edge 15 and the pointer 17 will not be transmitted back to the instrument 16 to undesirably affect the latter. As was indicated above, the turning of the lever 9 causes the pin 5 to be initially shifted so as to provide the smallest possible exposure aperture, and then if the lighting conditions are such that a reduction in exposure time is also required to make a proper exposure, the portion 13 of the lever 9 will engage the pin 6 to reduce the exposure time accordingly.

The actual exposure may be made by shifting of the element 22 beyond the position required for release of the levers 8 and 9 to the springs 19 and 20, or any other suitable provision for releasing the shutter to make the exposure may be provided. Upon release of the finger-piece 25 the spring 30 will of course return element 22 to its rest position determined by the engagement of the bottom ends of the slots 23 with the pins 24, and of course the extensions 26 and 27 will cooperate with the pins 28 and 29 to return the levers 8 and 9 to their rest positions so that scanning portions 14 and 15 move away from the pointer 17 which is now free to turn. Of course, in the illustrated example where the lever 9 has been selected for operation the lever 8 will be maintained in its rest position during the entire operation by cooperation of the pin 31 with the outer periphery 33 of the selecting ring 34, so that in this position of the parts only the lever 9 will be returned in opposition to the spring 20 to the rest position indicated in FIG. 1.

If it is desired to take a photograph of a rapidly moving subject, then the arm 35 is turned by the operator to the other position indicated by the indicator plate 39, and as a result the outer peripheral surface 33 of the selector ring 34 is located opposite the pin 32 so that the spring 20 cannot turn the lever means 9 from its rest position, while the notch 40 is now aligned with the pin 31 so that the lever means 8 is capable of being turned by the spring 19 when the operator moves the holding means 22 downwardly in opposition to the spring 30. The above-described operations which take place in connection with the lever means 9 now take place in connection with the lever means 8 which of course initially reduces the exposure time so that the exposure is made with the smallest possible exposure time, since this is the program of control provided by the lever means 8.

Figure 3:
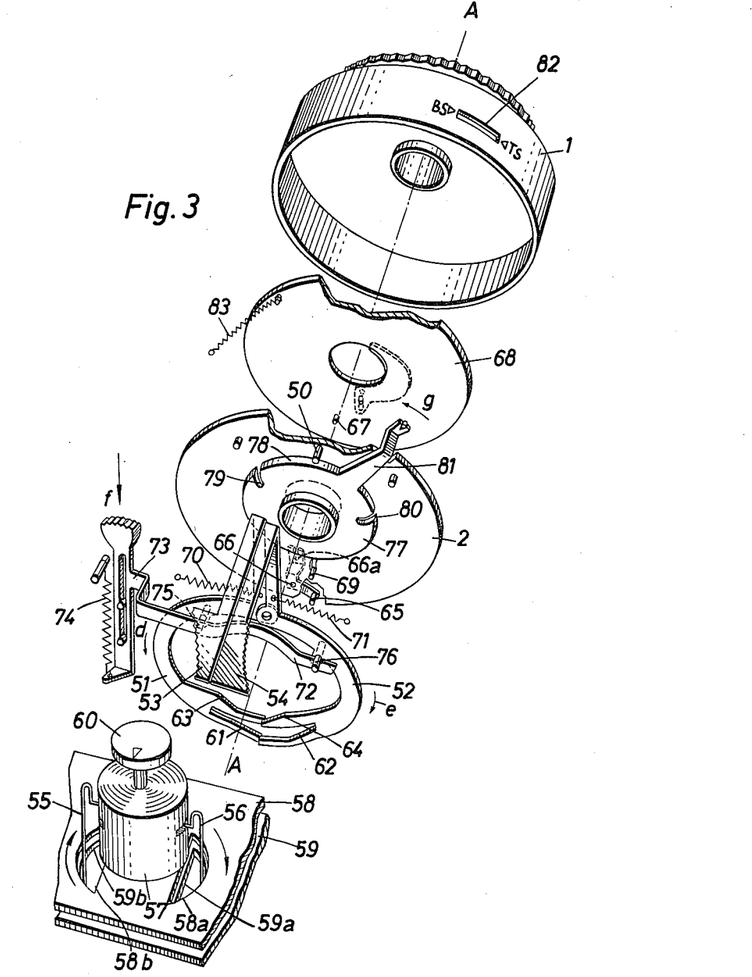
FIG. 3 is a perspective exploded view of another embodiment of an automatic camera structure according to the present invention.

In the embodiment of the invention which is illustrated in FIG. 3, the rear wall 2 of the shutter housing 1 also fixedly carries a pivot pin, and in the embodiment of FIG. 3 it is the pivot pin 50 which pivotally supports the pair of lever means 51 and 52 for turning movement one independently of the other. The pair of lever means 51 and 52 have arcuate portions which extend in opposite directions each through approximately 180° about the objective.

Each of the lever means 51 and 52 has a portion extending parallel to the optical axis A—A, and these latter portions are respectively provided with the scanning edges 53 and 54 which are toothed, as is clearly shown in FIG. 3. These scanning portions of the pair of lever means respectively cooperate with the pointers 55 and 56 which are fixed to the rotor of the electrical instrument 57. The pointer portions 55 and 56 with which the scanning portions 53 and 54 respectively cooperate extend parallel to the turning axis of the rotor of the electrical instrument, and the pointer portions 55 and 56 extend through the openings shown in FIG. 3 formed in a pair of stationary parallel spaced plates 58 and 59. Thus, the pointer 56 extends downwardly through aligned openings 58a and 59a formed in the plates 58 and 59, while the pointer 55 extends through the aligned openings 58b and 59b of the plates 58 and 59. Of course, in the rest positions of the levers 51 and 52, the scanning portions 53 and 54 of these levers are located not only between the plates 58 and 59 but also between the pointer portions 55 and 56 which are free to turn with the rotor to whatever position is called for by the light intensity, and when the lever 51 turns in the direction of the arrow $d$ from its rest position the scanning portion 53 will engage the pointer 55 and urge it against the curved edges of the openings 58b and 59b while when the lever 52 turns in the direction of the arrow $e$ from its rest position shown in FIG. 3 the scanning portion 54 will engage the pointer 56 and place it in engagement with the curved edges of the openings 58a and 59a. Of course, the space between the plates 58 and 59 is sufficiently great to provide unobstructed movement of the scanning portions of the levers 51 and 52 into engagement with the pointers 55 and 56, respectively. In order to introduce into the camera the factor of the speed of the film which is placed in the camera, the entire instrument 57 may be turned by manipulation of the knob 60 which is accessible at the top of the camera and which carries an index capable of being aligned with a suitable graduation on a scale of film speeds, as was the case with the embodiment of FIGS. 1 and 2, so that in this way it is possible to take into account the speed of the film which is placed in the camera.

The pair of lever means 51 and 52 are respectively provided with camming portions 61 and 62 for setting the exposure aperture of the camera and with camming portions 63 and 64 for setting the exposure time. For this purpose the pair of camming portions 61 and 62 cooperate with a pin 65 which is fixed to a lever 66 turnably carried by the wall 2 and having a bifurcated end portion 66a which receives the pin 67 of the diaphragm-adjusting ring 68 which is urged to its rest position providing, in the illustrated example, the largest exposure aperture by the spring 83. The camming edges 63 and 64 cooperate with a pin 69 which upon being moved along a suitable slot formed in the rear wall 2 will adjust the exposure time in a well-known manner. Of course, the pin 65 is also movable along a slot which is formed in the rear wall 2 of the shutter housing 1. Thus, with the embodiment of FIG. 3 there is also an exposure control means which includes the pins 65 and 69 and each of the lever means 51 and 52 is provided with a control portion provided by its camming edges which respectively cooperate with the control means 65, 69 for providing a preselected program of control for the camera.

A pair of turning means are operatively connected to the pair of lever means 51 and 52, respectively, for turning them from their rest positions indicated in FIG. 3, and this pair of turning means takes the form of the springs 70 and 71. Thus, the spring 70 is connected at one end to the lever 51 and at its opposite end to a stationary part of the camera for urging the lever 51 in the direction of the arrow $d$, while the spring 71 is connected at one end to the lever 52 and at its opposite end to a stationary part of the camera for urging the lever 52 in the direction of the arrow $e$. Each of the springs 70 and 71 is of course stronger than the spring 83 and the spring which cooperates with the exposure-time setting means to urge the pin 69 to its end position shown in FIG. 3.

A manually operable holding means 73 is provided for holding the levers 51 and 52 in their rest positions indicated in FIG. 3, and this holding means 73 is in the form of a rigid member formed with an elongated slot receiving pins for guiding the holding means 73 for vertical movement, as indicated in FIG. 3, and a spring 74 which is stronger than the springs 70 and 71 urges the releasable and manually operable holding means 73 to its initial position indicated in FIG. 3, this position being determined by the lower end of the slot of member 73 and the lower pin shown in FIG. 3. Spring 74 is connected at its lower end to the member 73 and at its upper end to a stationary pin of the camera. The member 73 includes an elongated arm 72 which engages a pair of pins 75 and 76 respectively carried by the levers 51 and 52 for moving these levers under the influence of the spring 74 to the rest positions indicated where the springs 70 and 71 are of course tensioned. Thus, when the operator moves the holding means 73 in the direction of the arrow $f$ the arm 72 will move downwardly away from the pins 75 and 76, and then that lever means 51 and 52 which has been selected for operation according to the desired program of control will turn so as to automatically set the camera according to the lighting conditions. The pins 75 and 76 extend through the levers 51 and 52, and the forward portions of these pins 75 and 76 form projections of the levers 51 and 52 which cooperate with the manually operable selecting means.

This selecting means of the embodiment of FIG. 3 includes the selecting ring 77 provided with an arm 81 whose outer tip is accessible to the operator so that the operator may engage the arm 81 to turn it between the two possible positions which provide the two programs of control. In one of these positions the exterior periphery 78 of the ring 77 will block one of the pins 75 and 76 while one of the notches 79 and 80 formed in the selecting ring 77 will be aligned with the other pin to permit turning of the selected ring. Thus, in one angular position of the selecting ring 77 the notch 79 is aligned with the pin 75 to permit turning of the lever means 51, and in this angular position of the ring 77 the exterior periphery 78 of the ring 77 is located opposite the pin 76 so that the lever 52 cannot turn, while in the other position of the selecting ring 77 the notch 80 is aligned with the pin 76 to permit turning of the lever means 52 and at this time the periphery 78 of the ring 77 is aligned with the pin 75 to prevent turning of the lever means 51 by the spring 70. The free end of the arm 81 extends through the slot 82 formed in the outer cylindrical wall of the shutter housing 1, so as to be accessible to the operator, and at the opposite ends of the slot 82 the outer surface of the housing 1 is provided with indicia indicating the different programs of control.

In the illustrated position of the parts of the embodiment of FIG. 3, the outer end of the arm 81 is located at the right end of the slot 82 where there is an indication that in this position an exposure providing the greatest possible depth of field will be provided, and in this position the notch 79 is aligned with the pin 75 while the notch 80 is out of alignment with the pin 76. As a result when the operator moves the releasable holding means 73 downwardly the spring 71 will not be able to turn the lever 52. The lever 51 will however turn with the pin 75 moving along the notch 79, and initially the camming edge 61 will engage the pin 65 to gradually reduce the size of the exposure aperture in the illustrated example where it is assumed that initially the exposure aperture is at its largest size and also that the exposure time is at its longest interval. During this time the scanning means 53 approaches the pin or pointer 55 of the meter 57. Assuming that the scanning means 53 has not yet engaged the pointer 55 when the camming edge 61 has provided the smallest possible exposure aperture, then the continued turning of the lever means 51 in the direction of the arrow $d$ by the turning means 70 will place the camming edge 63 in engagement with the pin 69 so as to reduce the exposure time, and according to the particular lighting conditions the lever 51 will stop turning when the scanning means 53 engages the pointer 55, so that the extent of turning of the lever 51 is determined in this way by the lighting conditions. The curvature of the edge portion of the lever 51 in advance of its camming edge 63 is such that the pin 69 of the exposure-time setting means will not be moved until the inclined camming edge 63 engages the pin 69, and the curvature of the lever 51 at its edge subsequent to the camming 61 is such that the pin 65 will not be moved after it has been advanced through its entire range of movement by the camming edge 61. In this way the structure will operate automatically to provide a proper exposure according to the lighting conditions with the smallest possible exposure aperture so that there will be the greatest depth of field. The shutter can be tripped to make the exposure in any suitable way such as by continued downward movement of the member 73 beyond the position required for setting of the camera. Of course, when the operator releases the holding means 73 the spring 74 returns it to its initial position and the arm 72 engages the pin 75 to return the lever means 51 to its initial position. The return springs within the housing 1 return the diaphragm to its initial position providing in the illustrated example the largest aperture and the exposure-time setting means to its initial position providing the longest exposure time.

Assuming that it is desired, with the structure of FIG. 3, to provide a photograph of a rapidly moving subject so that the smallest possible exposure time is desired, the operator will turn the arm 81 in the direction of the arrow g to the left end of the slot 82 where there is an indication that in this position a proper exposure for a rapidly moving subject will be provided. In this position of the arm 81 the ring 77 will have its slot 80 aligned with the pin 76 while the slot 79 will be out of alignment with the pin 75 so that the outer periphery 78 of the ring 77 will prevent turning of the lever 51 by the spring 70. When the operator now depresses the releasable holding means 73 in opposition to the spring 74 the arm 72 will again move downwardly away from the pins 75 and 76, and at this time the lever 52 will turn in the direction of the arrow e. At this time the camming edge 64 will during the initial turning of the lever 52 by the spring 71 engage the pin 69 to reduce the exposure time, and the diaphragm will remain at its initial position providing the largest aperture. The scanning means 54 will of course approach the pointer 56 of the meter 57. Assuming that when the smallest exposure time has been reached the scanning means 54 has not yet reached the pointer 56, the lever 52 will of course continue to turn, and at this time the camming edge 62 will engage the pin 65 so as to reduce the size of the exposure aperture, and this operation will continue until the scanning means 54 engages the pin or pointer 56, according to the lighting conditions. In this way an exposure will be provided with the smallest possible exposure time. The edge of the lever 52 subsequent to its camming edge 54 will not provide further movement of the pin 69, while the edge of the lever 52 in advance of its camming edge 62 does not provide movement of the pin 65. Of course, in this case also the continued downward movement of the releasable holding means 73 beyond the position required for setting of the camera may be used for tripping the shutter so as to make the exposure, and when the holding means 73 is released the spring 74 will return it to its initial position and the arm 72 will engage the pin 76 to return the lever 52 to its rest position, and of course the return springs within the housing 1 will return the diaphragm structure and the exposure time structure to their initial positions also.

Figure 4:
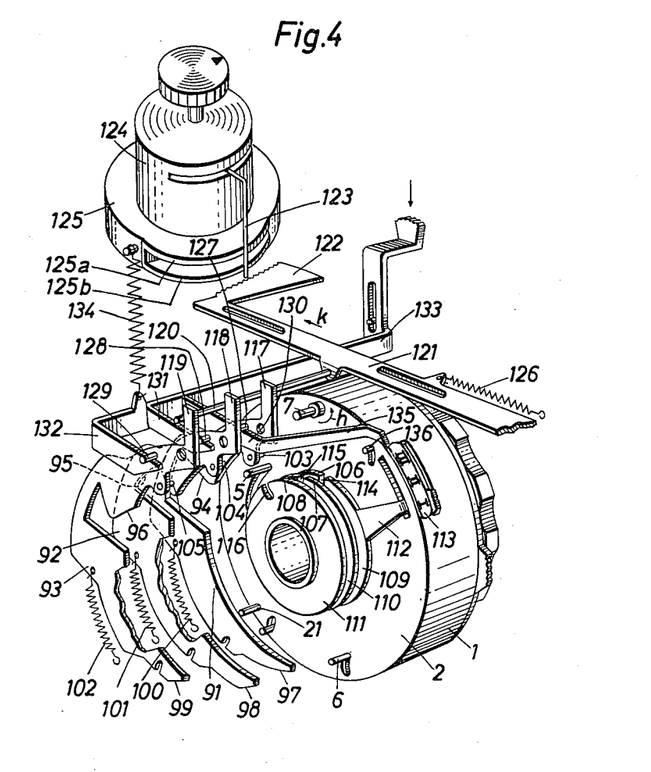
FIG. 4 is a perspective exploded view of a third embodiment of a structure according to the present invention.

The embodiment of the invention which is illustrated in FIG. 4 corresponds in general to that of FIGS. 1 and 2. In the embodiment of FIG. 4, however, there are three lever means which are supported for turning movement by the pin 7 which is fixed to the rear wall 2 of the shutter housing 1. The three lever means 91, 92 and 93 are independently turnable about the pivot pin 7 which forms a support means together with the wall 2 for supporting each of the lever means for independent turning movement. The several lever means 91–93 are respectively provided with camming portions 94–96 which will set the exposure aperture, and the three lever means 91–93 are respectively provided with camming portions 97, 98 and 99 for setting the exposure time. Thus, the several camming portions 94–96 cooperate with the pin 5 to set the diaphragm, and the camming portions 97–99 cooperate with the pin 6 for setting the exposure time, as was described above in connection with FIG. 1. The lever means 91 of FIG. 4 is different from any of the above-described lever means in that its camming portions 94 and 97 simultaneously engage and move the pins 5 and 6, respectively, throughout the entire range of turning of the lever means 91, so that when this lever means 91 is selected for operation there will be a simultaneous reduction in the size of the exposure aperture and reduction in the length of the exposure time during the entire turning of the lever means 91. On the other hand, the levers 92 and 93 are similar to those described above in that the camming portions 95 and 98 of the lever 92 and the camming portions 96 and 99 of the lever 93 are arranged to actuate the pins 5 and 6 one after the other according to the particular program, as described above.

Three turning means respectively cooperate with the three lever means 91–93 for turning the selected lever means, and these three turning means take the form of the springs 100, 101, and 102 shown in FIG. 4. Each of these springs is connected at one end to the lever means which it turns and at its opposite end to a stationary part of the camera. For example, all of the springs may be connected to the stationary pin 21 for this purpose. The several springs 100–102 respectively urge the levers 91–93 in the direction of the arrow h shown in FIG. 4 adjacent the pivot pin 7. The several lever means 91–93 respectively carry projections in the form of pins 103–105 which respectively cooperate with the selecting means to provide operation of only one of the lever means at any one time, according to the selection of the operator. The selecting means of the embodiment of FIG. 4 takes the form of three rings 109–111 which are coaxially fixed to each other and which are spaced from each other along the optical axis, and all three of these rings turn simultaneously. An arm 112 is fixed to and extends from the ring 109 for this purpose, and this arm 112 extends through slots formed in the shutter housing 1, as indicated in FIG. 4, so that the outer end of the arm 112 is accessible to the operator, and an indicating plate 113 cooperates with the outer end of the arm 112 for indicating one of the three possible settings of the selecting means. The several selecting rings 109–111 are respectively formed with notches 114–116 which are angularly offset one with respect to the other, and in the different angular positions of the selecting means only one notch will at any one time be aligned with one of the pins 103–105 so that only a selected lever means 91–93 will be free to operate at the given setting of the selecting means.

In the embodiment of FIG. 4, the upper free ends 117–119 of the lever means 91–93 are located alongside of a common rigid pin 120 which extends parallel to the optical axis and which is fixed to a slide bar 121 which is guided through a suitable pin-and-slot guide or the like for movement in the direction of the arrow k, this bar 121 being urged to the right, as viewed in FIG. 4, to its rest position by the spring 126 which at one end is connected to the bar 121 and which at its opposite end is connected to a stationary part of the camera. At its left end, as viewed in FIG. 4, the bar 121 carries the scanning means 122 which has a toothed edge adapted to cooperate with the pointer 123 which is fixed to the rotor of the electrical instrument 124 carried by the stationary support 125 which has the pair of parallel spaced arcuate edge portions 125a and 125b which cooperate with the free end of the pointer 123 to limit the deflection thereof when engaged by the scanning means 122 which is free to move into the space between the portions 125a and 125b. In the rest position of the parts shown in FIG. 4 the spring 126 maintains the scanning means 122 spaced from the pointer 123 which is thus free to turn to whichever angular position it takes according to the lighting conditions. In the embodiment of FIG. 4 the instrument 124 is also angularly turnable by the operator for the purpose of setting into the camera the factor of the speed of the film which is to be exposed.

The several lever means 91–93 respectively carry pins 127–129 which respectively engage the upper edges of the rigid extensions 130–132 of the releasable, manually operable holding means 133 which is guided for vertical movement by a pin-and-slot guide means, for example, and which is urged to its initial position by the return spring 134 which is connected at one end to the releasable holding means 133 and at its opposite end to a stationary part of the camera such as a pin which is carried by the stationary support plate 125. Of course, the spring 134 is stronger than the springs 100–102 so that in the rest position of parts the springs 100–102 are under tension and the several extensions 130–132 cooperate with the pins 127–129 for holding the several lever means 91–93 in their rest positions indicated in FIG. 4. The extension 130 of the releasable holding means 133 is rigidly fixed with a further extension 135 which has a free end located over the pin 136 which, when moved downwardly, as viewed in FIG. 4, will trip the shutter so as to make the exposure, and thus when the operator moves the releasable holding means 133 downwardly in opposition to the spring 134 not only will the selected lever means be released for operation to provide the selected program of control, but in addition after sufficient downward movement of the holding means 133 to afford an opportunity for the camera to be automatically set the free end of the extension 135 will engage the pin 136 so as to trip the shutter and make the exposure. The structure which is connected to the pin 136 for tripping the shutter is purely conventional and well-known in the art.

With the embodiment of FIG. 4, as was the case with the other embodiments described above, in the rest position of the parts the diaphragm is set at its largest exposure aperture and the exposure time is set at its longest duration. With the arm 112 in the position shown in FIG. 4 the notch 114 of the ring 109 of the selecting means is aligned with the projection or pin 103 of the lever 91, while the outer peripheries 107 and 108 of the rings 110 and 111, respectively, will cooperate with the pins 104 and 105 to prevent turning of the levers 92 and 93. Thus, with the parts in the position shown in FIG. 4, when the operator depresses the releasable holding means 133, moving it downwardly in the direction of the arrow i shown in FIG. 4, only the lever 91 will be able to turn so as to provide for a simultaneous reduction in the size of the exposure aperture and in the size of the exposure time throughout the turning of the lever 91, as described above. The free end portion 117 of the lever 91 engages the pin 120 for advancing the slide bar 121 in opposition to the spring 126 until the scanning portion 122 engages the pointer 123 of the meter 124, and thus the extent of turning of the lever 91 is determined by the lighting conditions. Of course, the spring 100, as well as the springs 101 and 102, is stronger than the spring 126. Thus, when the scanning means 122 engages the pointer 123 and places it in engagement with the edge portions 125a and 125b the bar 121 will not be able to move further and the turning movement of the lever 91 will be arrested. The continued downward movement of the releasable holding means 133 by the operator will cause the extension 135 to engage the pin 136 for tripping the shutter making the exposure.

Upon release of the holding means 133 the spring 134 will return the holding means to its initial position and at this time the extension 130 of the releasable holding means 133 will engage the pin 127 for returning the lever means 91 to its starting position, and as the upper end 117 of the lever 91 turns away from the pin 120 the spring 126 can return the slide bar 121 and the scanning means 122 to its initial position, thus releasing the pointer 123 so that it can assume whatever angular position is called for by the lighting conditions.

If a different program of control is desired, the operator may, for example, turn the arm 112 until its free end is located in alignment with the graduation of the scale 113 which is midway between the ends of the slot through which the free end of the arm 112 extends, and in this position of the selecting means the notch 115 of the intermediate ring 110 will be aligned with the pin 104 of the lever 92, so that this is the lever which will be free to turn in this position of the selecting means. When the lever 92 is turned by the spring 101 upon downward movement of the releasable holding means 133 by the operator, its camming edge 98 initially engages the pin 6 for moving this pin downwardly to reduce the exposure time, and then, if the lighting conditions require an aperture smaller than the largest aperture, the continued turning of the lever 92 will cause its camming edge 95 to cooperate with the pin 5 for reducing the size of the exposure aperture, and thus the selection of the lever 92 will provide for an exposure with the smallest possible exposure time. Therefore, this selection is made when photographing a rapidly moving subject. Of course, the turning of the lever 92 will cause its free end 118 to engage the pin 120 for moving the bar 121 in opposition to the spring 126 until the scanning means 122 engages the pointer 123, so that in this case also the extent of turning of the lever 92 is determined by the lighting conditions, and in the same way the continued downward movement of the holding means 133 after the automatic setting of the camera will cause the extension 135 to engage the pin 136 for tripping the shutter. The spring 134 returns the parts to their initial position in the manner described above, and of course the turning of the end 118 of the lever 92 back to its starting position enables the spring 126 to return the bar 121 to its starting position where the scanning means 122 is spaced from the pointer 123 which is now free to turn according to the changes in the lighting conditions.

In much the same way the arm 112 may be turned so that its free end is located at the opposite end of the slot of the housing 1 with the free end of the arm aligned with the graduation at the end of the scale 113 opposite from that with which the free end of the arm 112 is aligned in FIG. 4, and at the this time the notch 116 will be aligned with the pin 105 while the outer peripheries of the rings 109 and 110 will prevent turning of the levers 91 and 92, so that only the lever 93 can turn at this time. During the initial turning of the lever 93 by the spring 102, upon downward movement by the operator of the releasable holding means 133, the camming edge 96 will first engage the pin 5 so as to reduce the size of the exposure aperture, and then if the lighting conditions are such as to require a further reduction in the exposure, the camming edge 99 will cooperate with the pin 6 to reduce the exposure time, so that with the parts in this position and exposure will be made with the greatest possible depth of field. Here again the spring 134 returns the parts to their initial position, the extension 132 at this time cooperating with the pin 129 for returning the lever 93 to its initial position in opposition to the spring 102, and of course the turning of the upper end 119 of the lever 93 back to its starting position frees the pin 120 and the bar 121 for movement by the spring 126 back to their starting position where the scanning means 122 releases the pointer 123 for turning movement.

Of course, the invention is not necessarily limited to all of the details described above. In particular, scanning arrangements different from those described above may be used. Also, there is the possibility of providing, through suitable configurations of the camming edges of the several lever means, programs of control different from those described above, providing different combinations of exposure time and exposure aperture. For example, it is possible to provide with suitable configuration of the camming edges of the several lever means combinations of exposure time and exposure aperture which will change from one light value to another light value.

It will be understood that each of the elements described above, or two or more together, may also find a useful application in other types of cameras differing from the types described above.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, diaphragm control means for setting the diaphragm of the camera; exposure time control means for setting the exposure time of the camera; support means; a pair of lever means turnably carried by said support means for movement from a rest position, each of said lever means having a pair of control portions respectively cooperating with said diaphragm control means and said exposure time control means during turning of the lever means from a rest position thereof for setting the diaphragm and the exposure time of the camera, said pairs of control portions of said pair of lever means respectively providing different programs of control, and each of said lever means also having a scanning portion; manually operable selecting means cooperating with the pair of lever means for selecting which of said lever means is to turn from said rest position thereof and for preventing movement of the non-selected lever means from its rest position, so that said selecting means can be manipulated by the operator selecting one of the programs; and sensing means sensing the lighting conditions and located in the paths of turning of said scanning portions of said pair of lever means, respectively, for limiting the turning of the selected lever means to an angle determined by the lighting conditions so that in accordance with the selected program the diaphragm and exposure time of the camera will be set according to the lighting portions.

2. In a camera, in combination, exposure control means for setting the camera to control the exposure of film therein; support means; a plurality of levers for respectively providing different programs of camera control, said levers respectively being turnably carried by said support means for movement from a rest position and respectively having control portions which engage said control means during turning of any one of said lever means from said rest position thereof for actuating said control means to set the camera according to the program of control determined by the lever means which turns from its rest position, each of said lever means having a projecting portion which turns therewith; manually movable selecting means carried by said support means and being movable by the operator for selecting one of said lever means to provide a selected program of control, said selecting means having a plurality of positions in each of which said selecting means is located in the path of movement of the projecting portions of said lever means with the exception of one projecting portion which is free to move so that the lever means which carries said one projecting portion can turn to control the camera according to the program of said one lever means, whereby the operator can place said selecting means in a selected position to select the particular lever means which is to be turnable from its rest position to provide the selected operation; and scanning means actuated by said lever means and cooperating with a means which senses the lighting conditions for limiting the turning of the selected lever means to an angle which is determined by the lighting conditions, so that the camera will be set in accordance with the lighting conditions.

3. In a camera, in combination, support means; exposure control means carried by said support means; a plurality of lever means turnably carried by said support means for turning movement from a rest position, each of said lever means having a control portion which engages and actuates said exposure control means during turning of each lever means from its rest position for setting the camera to make an exposure of film therein, the several control portions of said plurality of lever means providing different programs of control; scanning means actuated by each of said lever means during turning from said rest position; light-sensing means cooperating with said scanning means for limiting the movement thereof according to the lighting conditions, said scanning means and light sensing means cooperating to limit the turning of each of said lever means to an extent determined by the lighting conditions, so that each lever means will set the exposure control means of the camera according to the lighting conditions; a plurality of projections respectively carried by said plurality of lever means movable along predetermined paths during turning of said plurality of lever means from said rest position thereof, respectively; and a manually turnable ring carried by said support means and formed at its periphery with a plurality of notches equalling the number of said projections, said ring having a plurality of angular positions where said notches are respectively aligned with said projections and only one of said notches being aligned with one of said projections in one position of said ring, whereby the periphery of said ring prevents turning of all but one of said lever means according to the angular position of said ring, so that when the operator turns the ring to a selected angle position the program of the lever which is free to turn will be selected to control the camera.

4. In a camera, in combination, support means; exposure control means carried by said support means for controlling an exposure made by the camera; a plurality of lever means turnably carried by said support means for movement from a rest position, each lever means having a control portion engaging and actuating said control means during turning of said lever means from said rest position thereof and several control portions of the plurality of lever means respectively providing different programs of control; manually operable selecting means cooperating with said plurality of said lever means for selecting only one lever means for operation at any one time; light-sensing means for sensing the lighting conditions; and a single scanning means actuated by whichever one of said lever means is selected for operation by the operator and engaging said light-sensing means which limits the movement of said scanning means to an extent determined by the lighting conditions, so that the selected lever means will also turn through an angle determined by the lighting conditions during setting of said exposure control means.

5. In a camera, in combination, support means; exposure control means carried by said support means; a pair of two-armed lever means turnably carried by said support means for turning movement about a common axis, each of said lever means having a control portion actuating said control means for setting the camera during turning of each lever means from its rest position, said control portions of said pair of lever means providing different programs of control of the camera and said control portions respectively being located on one of the arms of said pair of lever means, the other arms of said pair of lever means respectively having scanning portions; and light-sensing means cooperating with said scanning portions for limiting the turning of whichever lever is selected by the operator to be turned from its rest position in accordance with the selected control program, said sensing means having a single element engaged by the scanning portion of the selected lever means for limiting the turning movement of the latter to an angle determined by the lighting conditions; and manually operable selecting means available to the operator for selecting one or the other of said lever means for operation.

6. In a camera, in combination, exposure control means; support means; a pair of levers turnably carried by said support means for turning movement about a common axis, said levers respectively having control portions which respectively engage and actuate said control means for setting the camera, and said control portions respectively providing different programs of control; manually operable selecting means cooperating with said levers for selecting one of said levers for operation according to the desired program of controls; a pair of turning means respectively cooperating with said pair of lever means for turning them in the same angular direction from a predetermined rest position; a pair of scanning means respectively actuated by said pair of lever means and turning therewith; and light-sensing means cooperating with said pair of scanning means for limiting the movement thereof according to the lighting conditions, so that the selected lever will turn only through an angle determined by the lighting conditions during setting of the camera.

7. In a camera, in combination, exposure control means; support means; a pair of lever means turnably carried by said support means for turning movement from a rest position, said pair of lever means respectively having control portions engaging said control means to set the camera during turning of said pair of lever means; a pair of turning means respectively cooperating with said pair of lever means for respectively turning the same in opposite directions from said rest position; a pair of scanning means respectively carried by said pair of lever means for turning movement therewith; light-sensing means for cooperating with said pair of scanning means for engaging the same to limit the turning of said pair of lever means according to the lighting conditions; and manually operable selecting means available to the operator for selecting one or the other of said lever means for operation.

8. In a camera, in combination, support means; spring-urged exposure control means carried by said support means and spring-urged to a given rest position; lever means turnably carried by said support means for turning movement from a rest position of said lever means and having a control portion engaging said control means for actuating the same; spring means having a force great enough to move said spring-urged exposure control means from said rest position thereof, said spring means being operatively connected to said lever means for turning the same from said rest position thereof; scanning means actuated by said lever means during turning thereof by said spring means from said rest position thereof; and light-sensing means cooperating with said scanning means for limiting the movement thereof according to the lighting conditions, so that the turning of said lever means is also limited according to the lighting conditions.

9. In a camera, in combination, exposure control means; lever means having a rest position and being turnable therefrom, said lever means having a control portion engaging said exposure control means for actuating the same to set the camera; spring means cooperating with said lever means for urging the same to turn from said rest position thereof; scanning means actuated by said lever means during turning thereof; light-sensing means for sensing the lighting conditions and cooperating with said scanning means for limiting the movement thereof according to the lighting conditions, so that said lever means turns through an angle determined by the lighting conditions; holding means cooperating with said lever means for holding the same in opposition to said spring means in said rest position, said holding means including a spring urging said holding means to a given starting position and said spring being stronger than said spring means; and manually-engageable means cooperating with said holding means for moving with the latter in opposition to said spring to a position releasing said lever means to be turned by said spring means.

References Cited in the file of this patent
UNITED STATES PATENTS

| | | |
|---|---|---|
| 2,923,216 | Greger | Feb. 2, 1960 |
| 2,969,004 | Gebele | Jan. 24, 1961 |
| 2,984,164 | Melle | May 16, 1961 |
| 2,990,758 | Sauer | July 4, 1961 |
| 2,993,422 | Rentschler | July 25, 1961 |
| 2,999,438 | Nerwin | Sept. 12, 1961 |
| 3,000,280 | Faulhaber | Sept. 19, 1961 |